United States Patent [19]

Westphal

[11] Patent Number: 5,424,744
[45] Date of Patent: Jun. 13, 1995

[54] SENSOR ARRANGEMENT FOR SENSING A THREAT

[75] Inventor: Robert Westphal, Nurnberg, Germany

[73] Assignee: Diehl GmbH & Co., Nurnberg, Germany

[21] Appl. No.: 184,698

[22] Filed: Jan. 21, 1994

[30] Foreign Application Priority Data

Jan. 23, 1993 [DE] Germany .............. 43 01 826.2

[51] Int. Cl.⁶ .......................................... G08B 13/18
[52] U.S. Cl. ...................................... 342/27; 342/125; 342/147; 340/552
[58] Field of Search ............... 342/13, 27, 125, 147; 340/552

[56] References Cited

U.S. PATENT DOCUMENTS

| | | | |
|---|---|---|---|
| 3,541,551 | 11/1970 | Bystrom, Jr. et al. | 342/27 |
| 4,132,988 | 1/1979 | Blacksmith et al. | 340/552 |
| 4,149,157 | 4/1979 | Guennon | 340/554 |
| 5,049,858 | 9/1991 | Price | 340/552 |
| 5,280,294 | 1/1994 | Hammerquist | 342/453 |

FOREIGN PATENT DOCUMENTS 977984  9/1974  Germany .

OTHER PUBLICATIONS

Soldat Und Technik, "Die Luftwaffe in der NATO--Luftverteidigung (II)", 1984, pp. 601–609.

Primary Examiner—J. Woodrow Eldred
Attorney, Agent, or Firm—Scully, Scott, Murphy & Presser

[57] ABSTRACT

A sensor arrangement for the sensing, through the intermediary of the intermediary of high-frequency of an actual threat against an object which is equipped with a receiver device by an attacker penetrating into a radio link. The arrangement has the receiver device designed for the receiving or pickup of radio reception links from a plurality of satellites operating at the same or different frequencies, and which includes at least one comparator stage for the evaluation of the radio reception link which has been influenced by a penetrating potential attacker in comparison with an uninfluenced radio reception link.

9 Claims, 2 Drawing Sheets

SENSOR ARRANGEMENT FOR SENSING A THREAT

BACKGROUND OF THE INVENTION

1. Field of the Invention

The present invention relates to a sensor arrangement for the sensing, through the intermediary of high-frequency means, an actual threat against an object which is equipped with a receiver device by an attacker penetrating into a radio link.

2. Discussion of the Prior Art

A sensor arrangement of the above-mentioned kind is known from the disclosure of German Patent No. 977 984 as an installation for the protection of objects from the effect of missiles. In that arrangement, an object which is either stationary or adapted to travel on land or water carries a transmitter as well as a number of receivers in order, to a certain extent, build up an immaterial or intangible network of radio links in the half space extending about itself. Upon the entry of a foreign body into this network, the radio link which is contacted thereby; acting essentially in the manner of a light barrier, is intended to trigger a defensive medium in the form of a sheaf or burst of the smallest hollow charges in order to damage or even destroy the incoming foreign body. However, inasmuch as this defensive network with its transmitters and receivers for the individual radio links is deployed at a comparatively close distance from the actual object which is to be protected, the object must be armored so as to be protected from the fragmentation effect which is unavoidable during the course of the development of the defensive mechanism. More specifically, any detection of the attacker closely before reaching the object which is to be protected prevents any effective countermeasures, such as evasive maneuvers or the deployment of defensive measures which act at a greater distance. Consequently, this arrangement is not adapted; for example, for the protection of transport aircraft. In addition thereto, there is an increased danger to the object which is to be protected, since for the setting up of the defensive network, it must be equipped with a transmitter and thus can be especially easily located by the attacker.

For a threat analysis extending over a somewhat greater distance, recourse is had to radar installations which operate monostatically, and which can concurrently serve for guidance of air defense missiles, such as in the case of the PATRIOT system; as disclosed in SOLDAT UND TECHNIK, Issue 11/1984, pages 601–609; in particular FIG. 6 on page 606. However, movable objects which are to be protected, and especially protected aircraft, cannot be ordinarily equipped with such voluminous radar installations, quite apart from their heavy power supply for generating a few 100 kVA. Moreover, the inherent endangerment of such radar installations is extremely great due to their high level of energy radiation. However, in the respective position-finding or tracking direction, their effective range is nevertheless comparatively restricted, in view of the emitted energy as well as the energy which is reflected by a potential attacker are presently subjected to an attenuation or dampening effect increasing at square the distance. Finally, such radar installations, in their roundabout surveillance without special directional vectoring, operate relatively sluggishly because they can only search the surroundings in narrow successive directional lobes. This is encountered, because during the roundabout search, the range of detection drops off substantially still more due to shorter dwelling periods of the target within the radar beam.

SUMMARY OF THE INVENTION

Accordingly, it is an object of the present invention to provide a sensor arrangement of generally the type set forth hereinabove, which can not only be employed without difficulty against flying objects with regard to its demand on circuitry and constructional volume, but in addition thereto also facilitates an analysis of a threat while being secure from any self-betrayal, from earth-based objects extending outward to a medium range, and from objects operating above the surface of the earth outwardly up to very long distances; for example, as compared with an existing air defense radar.

In a sensor arrangement of generally the type set forth hereinabove, this object is essentially attained in that the arrangement has the receiver device designed for the receiving or pickup of radio reception links from a plurality of satellites operating at the same or different frequencies, and which includes at least one comparator stage for the evaluation of the radio reception link which has been influenced by a penetrating potential attacker in comparison with an uninfluenced radio reception link.

Pursuant to the foregoing, the object which is to be protected is equipped with at least one receiver device of comparatively small volume, and which is designed for the radio reception from satellites. As a result, the system can be used without problems in the air, and in particular can also be employed for crisis reaction forces which are to be placed into readiness as quickly as possible, inasmuch as the transmitter and its always highly expensive power supply do not constitute a part of the protective equipment. Consequently, this also eliminates all ecological and electrically-caused smog problems which are encountered in conjunction with energy radiation.

Preferably, signals are received and evaluated from satellites which are located as low as possible, because the respective radio link thereof with the receiving object sweeps over a correspondingly larger surface area along the surface of the earth, than would in the case of the reception from higher located satellites; but especially also than in the case of a reception from earth-bound transmitters. Hereby, the reception from satellite transmitters possesses the advantage over receptions from transmitters which are transported by means of airborne bodies in that the orbits of the satellites are tabularly plotted and known and, in practice, cannot be influenced by unauthorized personnel. Preferably, recourse is had to a radio reception from navigational satellite systems because of those a plurality are regularly located about the current point of location of the object which is to be protected at different aspect angles above the horizon, and since the satellites of such a system already beam information which is coordinated over time, and which information is optimized for the correlative signal processing thereof within a frequency range (above 1 GHz) which has a linear propagation similar to those of light beams.

When a foreign body, which may be an attacking projectile directed against the object which is to be protected, enters into such a satellite radio link, during the evaluation of the information received from this radio reception, there are encountered irregularities due to shading, scattering or absorption effects, which; for example, can disrupt a heretofore stationary satellite distance measurement, or change the polarization of the received satellite signal. Inasmuch as the point of location of the applicable satellite, the reception from which is currently being evaluated, is known relative to the object which is to be protected, the direction to the potential attacker determines itself from the actually disrupted radio reception. The continued behavior of the attacker can then be observed in a targeted or controlled manner; in effect, the identity thereof can be established through the usual clarifying media. The object itself is not subjected to any additional endangerment due to this threat analysis which is implemented at the farthest possible distance, since the object does not betray itself for that purpose through any energy radiation (radar silence). This, in particular, is especially important for sea-based sensor platforms.

Since; in effect, no installations are required at the location of utilization for the object which is to be protected for the functioning of such a threat analysis system with an early warning action which is effective over extremely great distances, but at the transmitting end recourse can be had to a free or random and continually-optimizable selection from the satellite transmitters which are in any event visible above the horizon, the inventive passive sensor arrangement is especially also adapted for the self-protection of land vehicles, sea vessels and aircraft for the supplying of crisis reaction forces which must be quickly deployed into a foreign area and there particularly exposed to terrorist threats through ground-to-air, air-to-ground or ground-to-ground projectiles over medium to long distances, or through helicopters operating at low level from concealment in the terrain.

BRIEF DESCRIPTION OF THE DRAWINGS

Additional alternatives and developments as well as further features and advantages of the invention will now be readily apparent from the following description of a preferred embodiment of the construction of a sensor arrangement, taken in conjunction with the accompanying drawings; in which.

DETAILED DESCRIPTION

A potentially threatened object 11 can be stationary; for example, such as building installation; quasi-stationary, such as a relatively slowly moving (land or sea) vehicle or craft; or as shown in the illustrated example, an aircraft, for example, a transport machine for the follow-up or resupply of support and auxiliary items at the operational location of crisis reaction forces. Such an operation in crisis regions increases the potential threat, to the extent that operational locations which are set up provisionally and only for a specified time do not provide for surveillance and defense logistics normally interconnected over a wide area so as to counteract a potential attacker 12; for example, a terroristic threat, i.e. ground-to-air projectile.

Figure 1:
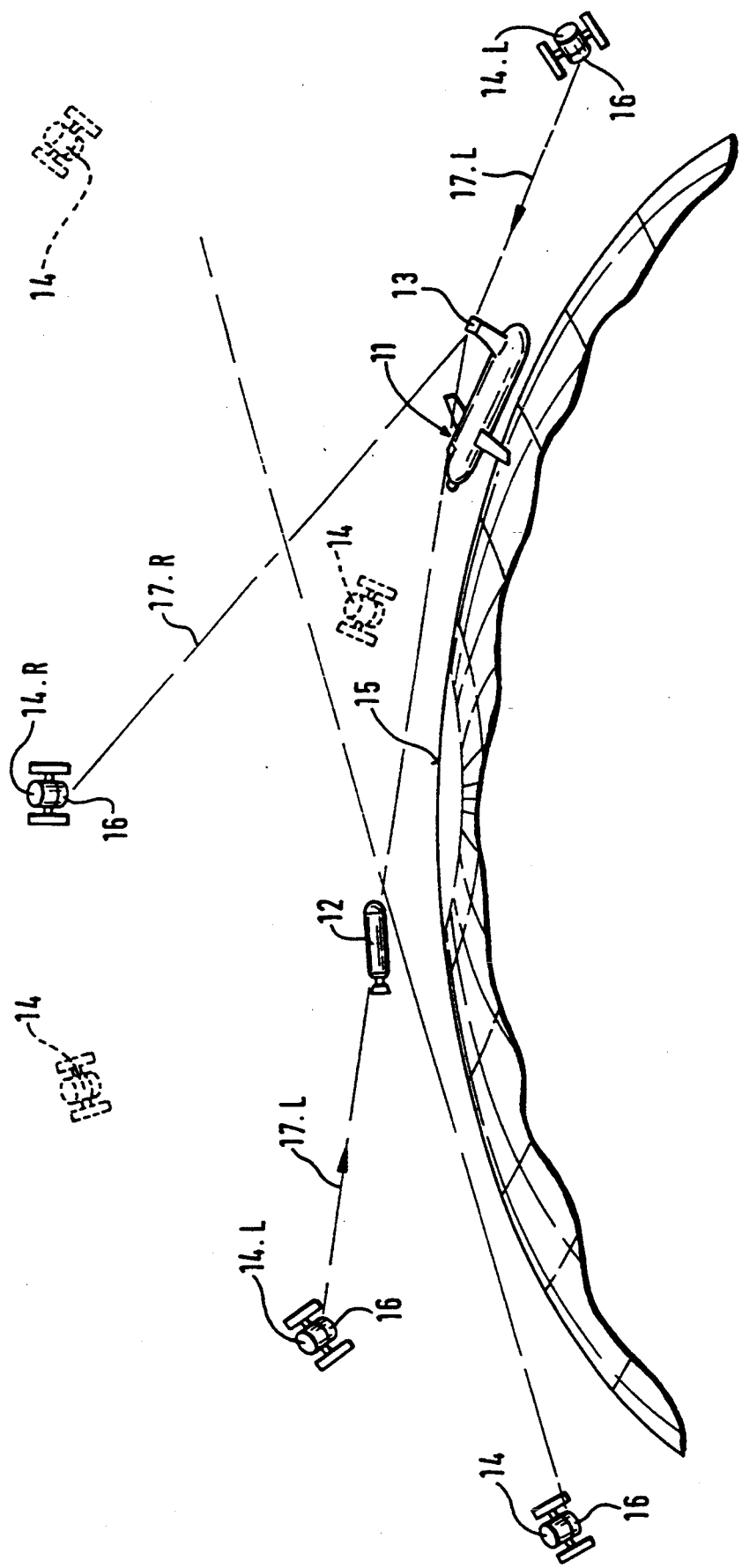
FIG. 1 illustrates a diagrammatic view of a scenario of a long-range threat situation and passive detection thereof from the threatened object.
Figure 2:
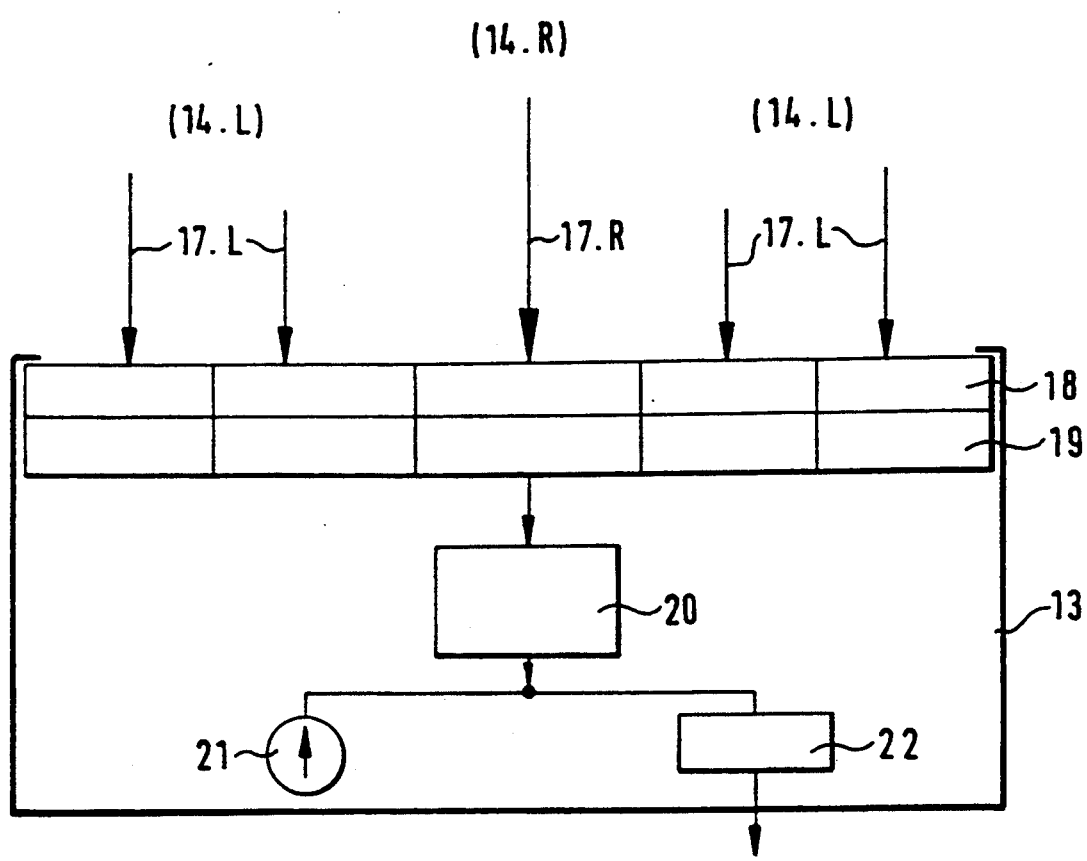
FIG. 2 illustrates a block circuit diagram of a receiver device with which the object shown in FIG. 1 is equipped for analysis of a current threat situation.

For the determination and analysis of an eventual actual threatening situation, within the present context also simply referred to as threat analysis, the object 11 which is to be protected is itself equipped with one or more receiver devices 13 for receiving the signals from satellites 14; preferably from such which are disposed distributed azimuthally about the actual location of the object 11 and as low above the horizon 15 as possible. The receiver device 13 preferably possesses an antenna configuration adapted for non-directional as well as scanning reception in azimuth and elevation. The satellites 14 which are shown through solid lines in the drawing are disposed along their respective orbit in the plane of the drawing in FIG. 1; whereas the satellites 14 shown in phantom lines are offset therebehind in the direction of viewing of the drawing. The high frequency of the energy radiated from the satellite transmitters 14 causes a propagation without any ground and spatial wave phenomena; in essence, a propagation which is substantially linear in a light beam-like shape so that only transmitters from transmitters 16 of satellites 14 which are located above the horizon 15 are received by the object 11. In this manner, regions of especially large areas in the surroundings about the elevation of the object 11 are swept by the radio links 17.L from particularly low located satellites 14.L to the low-positioned object 11. However, an existing radio reception link 17 from a satellite transmitter 16 to the receiver device 13 of the object 11 will be measurably impaired when the attacker 12 enters into that link. This then leads to reflection and shading effects (and an influence over the effective polarization) such that then; for example, suddenly no further stable or steadily changing distance information can be ascertained from that radio reception link 17 whose transmitter 16 is identifiable to the receiver device 13, due to the identification characteristics of that transmitter. Since the momentary position of this satellite 14 is known from the tables plotting the current satellite orbits, and the location of the receiving object 11 is known from its own positional determination, there is obtained the current direction of a threat on the basis of a significant influence on a specified radio reception link 17. The threat can then be verified by means of a radio search through aircraft operating in this direction, which; however, need not be carried out on board the object 11, but can be delegated to satellite and ground stations of the air monitoring system.

The influence over the radio reception link 17 resulting from the penetration of the attacker 12, lies in every instance in a reduction of the intensity and, above all, in a significant actual deterioration of the signal-noise ratio; and moreover in the sudden appearance of interferences and Doppler phenomena. Scatter effects at the attacker 12 are the more diffuse the greater the distance thereof from the object 11. These effects can superimpose themselves on the travel or transit time effects of transmission energy reflected by the attacker 12 from one or more satellites. When the transmitter 16 is located extremely low above the horizon 15 and, as a consequence, the radio link 17.L experiences excessive attenuation in the earth atmosphere 15, there always still remains the possibility of evaluation (which is rather more expensive in terms of circuitry) of an influence over the polarization of the energy radiated or beamed by the transmitter 16 with a known polarization vector into the radio link 17.L, which concurrently affords a rough type classification of the attacker 12. Furthermore, it is possible to measure suddenly encountered changes in the signal transmitting travel times, Doppler frequencies and the signal-noise spacings of the satellite signals.

Inasmuch as the threat analysis on board the object 11 is not based on the evaluation of its own reflected transmission energy, there does not result therefrom any increase in the probability of the object 11 betraying itself. At a comparable transmission power, the range which can thereby be achieved for the purposes of passive threat analysis is greater by an extent in the orders of magnitude than would be by means of a radar system, because the distance between the object 11 and the attacker 12, during this external field-evaluation, is only entered once into the measurement, and the level, in effect, only sinks with the second and not with the fourth power of magnitude relative to the distance to the object 11. The theoretical maximum range of the receiver device 13 is dependent upon the orbit of the satellites. In the instance of navigational satellites, the range is about 20,000 km. The measurement results from the threat analysis are also independent of the radar-effective scattering contour of the attacker 12, since the measurements actually are not based on reflex radiation but on the influence of external radiation, so that even an attacker 12 with pronounced stealth geometry will not remain unrecognized. Even an attacker 12 with a structure absorbing high-frequency radiation will be recognized, because a satellite transmitter 16 which is momentarily expected at a given position on the basis of the orbit data drops out precisely when such an attacker 12 enters into this specific radio reception link 17, which also represents a striking and clear-cut item of information for the threat analysis. Accordingly, the sensor arrangement forms the passive part of a quasi-multistatically coherent radar system, since the transmitters move apparently slowly relative to the object 11. There is also employed the multistatic radar cross-section of the attacker 11 for the evaluation. The low powers of the transmission of the satellites of about 50 watts are compensated for by now possible the length observation or surveillance times (target dwelling time) and the frequency-spread (spread-spectrum) continuous-wave signals from the satellites.

Preferably, the unidirectional radio reception links 17 of navigational satellites 14; for example, of the systems NAVSTAR-GPS or GLONASS, are evaluated for the threat analysis. This is because the information thereof is, in any case, expediently acquired on board the object 11 for determining its own location; for which purpose there are given radio receptions, as known, from four of the at least five satellites 14 located above the horizon 15. When more satellites 14 are 'visible' to the object 11, satellites 14.L which are distributed at as low an altitude as possible above the horizon 15 about the object 11, are received for implementing the threat analysis, for encompassing the air space over a largest possible surface area. The advantage in the evaluation of the radio links 17 with navigational satellites 14 hereby consists not only in that the orbits thereof are particularly accurately ascertained from their plotted tables, but also in that the items of navigational information represent ideal radar signals inasmuch as they are already optimized for the most highly precise correlation-transit time measurement, with the capability of increasing the degree of accuracy of distance measurement through the evaluation of not only the distance-dependent transit time, but in addition also the change in carrier phase. There is also obtained an all-around or comprehensive threat analysis which is optimized relative to reception expenditure, when three possibly lowest-located navigational satellites 14.L are azimuthally offset through angles of about 120° with regard to the location of the object 11 and, in addition, at least one further satellite 14.R is received most possibly in the vicinity of the zenith above the object 11, in order to derive from the latter the reference time information and from the others the items of transit time information which are related thereto for determining its own position; and moveover, for also deriving the interference information upon penetration by an attacker 12 into one of these radio reception links 17.L.

The receiver devices 13, with which the potentially threatened object 11 is equipped, possess input stages 18 which switch over serially or which operate in a parallel mode in a multi-channel configuration, for one or more reference satellites 14.R which are located as high as possible and which are received independently of direction, as well as for the selection of surveillance satellites 14.L, whose selection is implemented in a directionally-selective mode as low as possible above the horizon 15. Connected to the output of the input stage 18 in the receiver device 13 is at least one comparator stage 19 which, in the radio reception links 17.L currently being monitored, responds to the above-mentioned significant changes in comparison with the known items of information which are actually being expected or which are averaged when reception is undisturbed, from the specifically received satellite transmitters 16. A selector circuit 20 controls a display device 21 for the representation of that particular direction (relative to the actual movement of the object 11) in which a radio reception link 17.L is actually influenced with sufficient probability though the entry of a potential attacker 12; as well as an interface 22 to an evaluating computer. In the latter, in addition to items of directional information, there can be determined information about the size, the distance and/or motion vector of the attacker 12 relative to the object 11; for example, through a comparative evaluation of the influence on other radio reception links 17 which have just detected this attacker 12.

In any case, this inventive threat analysis, due to significant influences exerted over satellite radio reception links 17, represents an ideal as well as passive early warning system which is free from potential betrayal or being divulged, and which is practically impossible to be disrupted; for example, for directing a firing control-radar which is more expensive by orders of magnitude but is, in contrast, of a substantially shorter range; and also represents a means for the protection of ground-based stationary of movable objects. In the last-mentioned case of application, the determinable distance is somewhat shortened due to the ground-based receiver device 13 which is positioned at a low level, but in contrast with the relatively rapidly moved receiver device 13 located; for example, on an aircraft, the amount of expenditure for signal processing in the tracking down of anomalies in radio reception links 17 is lower, due to the receiving conditions which are stationary relative to the satellite movement.

The sensor arrangement pursuant to the invention thus renders it possible to detect the actual threat to an object 11 which is to be protected in that by this object 11 there are received from the transmitters a number of satellites 14.L which are located as low as possible above the horizon 15; preferably the satellites 14 which belong to a navigational system such as GPS or GLONASS. The sensor arrangement recognizes the direction from the object 11 to the attacker 12 from the fact that, upon the attacker 12 penetrating into actual satellite radio reception links 17.L, the heretofore quasi-stationary pickup of information (especially for ascertaining distance) is suddenly disrupted in at least this observed radio reception link 17.L, such as through Doppler effects, scattering phenomena or through shading or, respectively, absorption of the satellite-transmission field. This facilitates an effective, purely passive (in essence, free from self-betrayal) remote search or clarification for threat analysis over an extremely large distance, without having to provide expensive installations for that purpose in the vicinity of the actual operating location of the earth-based, sea-going or airborne object 11 which is to be protected. As a consequence, this sensor arrangement for threat analysis is particularly adapted for the supply aircraft, sea vessels and land vehicles of mobile crisis reaction forces.

The changing transit time effects, phase and Doppler effects, as well as the signal-noise spacings of the satellite signals in the evaluated radio reception links 17 as a consequence of the penetration by a potential attacker 12 into these radio reception links 17 are processed at the receiving end. Expediently, for an early as complete as possible analysis of interferences or disruptions, the items of processing information are exchanged among receiver devices 13 which are operated at a plurality of locations or, respectively, on board a plurality of objects 11 which are to be protected, and are thus interlinked. Multiple-sensor platforms or fire control-radar positions are also expediently equipped with such sensor arrangements.

In order still further to increase the satellite visibility, the target detectability and the immunity from disruptions of the sensor arrangement pursuant to the invention, the receiver devices 13 can be designed for the parallel processing of the radio signals received from different navigational satellite systems in time-multiplex and in frequency-multiplex modes.

For a defense against an actual threat situation from airborne attackers 12 which has been analyzed by the inventive sensor arrangement, it is possible to employ anti-aircraft projectiles which are equipped with the described receiver devices 13 as passive target-vectoring sensors and which can thus be very effectively used from below a covering as a so-called "fist" against low-flying aircraft and combat helicopters.

For the protection of an object at close-range (in the order of magnitude of over a few 10 km), the evaluation in the receiver device 13 can be designed in a manner to report the entry of a potential attacker 12.; for example, such as to protect armored vehicles, transport aircraft or command posts. Within the framework of protecting the object, the potential attacker can be reported in the medium range (up to a few 100 km); for example, to protect ships against the so-called "Seaskimmer" (by means of evaluation of the radio reception links 17.L with low-altitude satellites 14.L) or so-called "Skydivers" (by surveilling the radio reception links 17 with satellites 14 which are located proximate the zenith). Any change in the position of the weapon platforms thereof (generally aircraft) can also be determined through this remote search. In the more distant medium range (about a few 1000 km), the inventive sensor arrangement serves to report the entry of the potential attacker 12 into a radio reception link 17 in order to protect; for instance, ships and equipment from attacking aircraft. In that manner, it is also possible to set up an inexpensive but effective space defense-network to some extent as a far-reaching sensor screen extending over large regions and even over the territories of entire states or countries.

In order to suppress interference transmitters (jammers), the reception device 13 is equipped with at least one antenna which facilitates an electronic beam deflection in both azimuth and elevation. Thereby, the entry of a potential low-flying attacker 12; for example, such as combat aircraft, dispensing missiles and so-called cruise missiles, can be early and dependably detected.

The electronic smog problem which has been discussed with regard to surroundings of military and civilian air traffic safety equipment becomes irrelevant when the inventive passively-operating sensor arrangement is also employed for such stationary instances of application. Irrespective of whether the receiver device 13 is operated stationarily or movably, the receiver device 13 is expediently equipped with at least one omnidirectional reception antenna for the radio reception link 17.L with low-altitude satellites 14.L, and with at least one directional antenna for the reference-radio reception link 17.R.

What is claimed is:

1. A sensor arrangement for the high-frequencied sensing of an actual threat to an object equipped with receiver means by an attacker penetrating into a radio link, said receiver means picking up radio reception links from a plurality of satellites operating at selectively the same and different frequencies; and at least one comparator stage of said receiver means for evaluating a radio reception link which is influenced by the penetrating potential attacker in comparison with an uninfluenced radio reception link.

2. A sensor arrangement as claimed in claim 1, wherein said receiver means comprises means for receiving signals from a plurality of satellites which are disposed azimuthally distributed at low altitudes above the horizon and from at least one satellite which is located proximate the zenith.

3. A sensor arrangement as claimed in claim 1, wherein said receiver means comprises means for omnidirectional sensing and for sensing in azimuth and elevation.

4. A sensor arrangement as claimed in claim 1, wherein said receiver means is equipped with input stages for the parallel processing of a plurality of satellite radio reception links.

5. A sensor arrangement as claimed in claim 1, wherein said receiver means serially processes a plurality of satellite radio reception links.

6. A sensor arrangement as claimed in claim 1, wherein said receiver means comprises means which evaluates the radio reception links of satellites of a navigational satellite system.

7. A sensor arrangement as claimed in claim 1, wherein said receiver means comprises display means for the directional display of a radio reception link which is disrupted by the potential attacker penetrating into said link.

8. A sensor arrangement as claimed in claim 1, wherein said receiver means is responsive to a disappearance of items of quasi-stationary distance information which are determined through radio reception links between satellites and the object.

9. A sensor arrangement as claimed in claim 1, wherein said receiver means is responsive to a changed polarization in the satellite transmission energy in at least one radio reception link caused by the penetration of the link by a potential attacker.

* * * * *